US009599284B2

(12) United States Patent
Shin

(10) Patent No.: US 9,599,284 B2
(45) Date of Patent: Mar. 21, 2017

(54) DEVICE FOR REDUCING SLOSHING IMPACT OF CARGO HOLD FOR LNG AND METHOD FOR REDUCING THE SAME

(75) Inventor: Chan Hyo Shin, Tongyeong-si (KR)

(73) Assignee: Samsung Heavy Ind. Co., Ltd., Seoul, Seocho-Gu (KR)

( * ) Notice: Subject to any disclaimer, the term of this patent is extended or adjusted under 35 U.S.C. 154(b) by 124 days.

(21) Appl. No.: 13/810,038

(22) PCT Filed: Jul. 8, 2011

(86) PCT No.: PCT/KR2011/005009
§ 371 (c)(1),
(2), (4) Date: Jan. 14, 2013

(87) PCT Pub. No.: WO2012/008714
PCT Pub. Date: Jan. 19, 2012

(65) Prior Publication Data
US 2013/0112693 A1 May 9, 2013

(30) Foreign Application Priority Data
Jul. 13, 2010 (KR) ........................ 10-2010-0067280
Jul. 6, 2011 (KR) ........................ 10-2011-0067072

(51) Int. Cl.
*B60P 3/00* (2006.01)
*F17C 13/00* (2006.01)
(Continued)

(52) U.S. Cl.
CPC .............. *F17C 13/00* (2013.01); *B63B 25/08* (2013.01); *B63B 25/12* (2013.01); *F17C 13/004* (2013.01);
(Continued)

(58) Field of Classification Search
CPC . B63B 25/12; B63B 25/08; F17C 2223/0161; F17C 2270/0105; F17C 2221/033; F17C 2230/016
(Continued)

(56) References Cited

U.S. PATENT DOCUMENTS 2,870,455 A * 1/1959 Reeves ..................... E04H 4/10 139/420 A
3,797,670 A * 3/1974 Lavemour .................. 211/94.03
(Continued)

FOREIGN PATENT DOCUMENTS

JP S513020 A 1/1976
JP S591624 U 1/1984
(Continued)

OTHER PUBLICATIONS

Japanese Office Action dated Jan. 21, 2014 issued in corresponding Japanese Application No. 2013-519571.
(Continued)

*Primary Examiner* — Don M Anderson
(74) *Attorney, Agent, or Firm* — Harness, Dickey & Pierce, P.L.C.

(57) ABSTRACT

Disclosed are a device for reducing sloshing impact of a cargo hold for liquid cargo and a method for reducing the same. According to one embodiment of the present invention, the device for reducing the sloshing impact of the cargo hold for liquid cargo comprises: a rise guide unit which is installed at a proper place in a cargo hold, and includes a buoyant floating object that floats to the surface of the stored liquid; and a sloshing prevention member, which is restrained in the rise guide unit, floats the surface of the liquid by the floating object, and suppresses sloshing of liquid cargo.

7 Claims, 4 Drawing Sheets

(51) Int. Cl.
*B63B 25/08* (2006.01)
*B63B 25/12* (2006.01)

(52) U.S. Cl.
CPC *F17C 2201/0157* (2013.01); *F17C 2201/052* (2013.01); *F17C 2221/033* (2013.01); *F17C 2221/035* (2013.01); *F17C 2223/0153* (2013.01); *F17C 2223/0161* (2013.01); *F17C 2223/033* (2013.01); *F17C 2260/016* (2013.01); *F17C 2270/0105* (2013.01); *F17C 2270/0107* (2013.01)

(58) Field of Classification Search
USPC .............................. 220/562, 216, 218; 4/498
See application file for complete search history.

(56) References Cited

U.S. PATENT DOCUMENTS

| | | | | |
|---|---|---|---|---|
| 3,974,789 | A * | 8/1976 | de Groot | 114/256 |
| 5,301,628 | A * | 4/1994 | Daskalides | 114/230.27 |
| 7,393,254 | B1 * | 7/2008 | Young et al. | 441/1 |
| 2004/0232148 | A1 * | 11/2004 | Vera et al. | 220/216 |
| 2009/0078705 | A1 * | 3/2009 | Ramsay | B60K 15/077 220/562 |
| 2011/0278305 | A1 | 11/2011 | Chun | |
| 2012/0304372 | A1 * | 12/2012 | Wiebe | 4/498 |

FOREIGN PATENT DOCUMENTS

| | | | |
|---|---|---|---|
| JP | S6068090 | U | 5/1985 |
| JP | H09142582 | A | 6/1997 |
| JP | H1052191 | A | 2/1998 |
| JP | 2005306439 | A | 11/2005 |
| JP | 2006256659 | A | 9/2006 |
| JP | 2009241929 | A | 10/2009 |
| JP | 2010132287 | A | 6/2010 |
| KR | 20030050314 | A | 6/2003 |
| KR | 100935906 | B1 | 1/2010 |
| KR | 20100056351 | A | 5/2010 |
| KR | 20100077787 | A | 7/2010 |
| WO | WO-2010058932 | A2 | 5/2010 |

OTHER PUBLICATIONS

International Search Report PCT/ISA/210 for International Application No. PCT/KR2011/005009 dated Feb. 15, 2012.

* cited by examiner

DEVICE FOR REDUCING SLOSHING IMPACT OF CARGO HOLD FOR LNG AND METHOD FOR REDUCING THE SAME

CROSS-REFERENCE TO RELATED APPLICATIONS

This is a National Phase Application of PCT/KR2011/005009 filed Jul. 8, 2011, which is an International Application claiming priority to Korean Applications Numbers KR 10-2010-0067280 filed Jul. 13, 2010 and KR 10-2011-0067072 filed Jul. 6, 2011.

TECHNICAL FIELD

The present invention relates to a sloshing impact reducing device, and more particularly to a sloshing impact reducing device for a cargo hold for a liquid cargo installed to attenuate the impact force exerted by sloshing of a liquid cargo such as liquefied natural gas (LNG) or liquefied petroleum gas (LPG) in the cargo hold of a vessel carrying or containing the liquid cargo.

BACKGROUND ART

Natural gas is transported over long distances in a gaseous state through onshore or offshore pipelines, or in a liquefied gas (LNG) state in an LNG carrier ship to a location of consumption. The LNG, which is obtained by cooling natural gas to a very low temperature (about −163° C.), takes up about 1⁄600 of the volume of the natural gas in a gaseous state, and is therefore highly suitable for marine transportation over long distances.

An LNG carrier designed to transport LNG across the sea and deliver the LNG to a location of consumption on land or an LNG regasification vessel (LNG RV) designed to transport the LNG across the sea to the location of consumption on land and regasify the LNG for use on land includes a storage tank (hereinafter, referred to as a cargo hold) which is capable of withstanding the cryogenic condition of the LNG.

If the vessel is rocked with a liquid cargo like LNG contained in the cargo hold, motion of the liquid occurs, resulting in sloshing impact on sidewalls and ceiling structures 21 and 22 of the cargo hold 20, as shown in FIG. 1. Due to this sloshing impact, components configuring the cargo hold such as a heat insulator and a barrier may be damaged.

Sloshing refers to the movement of liquid contained in the cargo hold induced by motion of a vessel or floating structure which occurs in various marine conditions. If only a portion of the inside of the cargo hold is filled with liquid, sloshing induced by the motion of the liquid may severely impact the walls and ceiling of the cargo hold, which is referred to as sloshing impact.

The sloshing phenomenon as above inevitably occurs due to motion of the vessel at sea, and the cargo hold should be designed to have a sufficient strength to withstand the sloshing load.

FIG. 2 is a cutaway perspective view illustrating a conventional cargo hold designed to prevent sloshing.

With reference to FIG. 2, a technique of forming an upper chamfer 31 and lower chamfer 32 at the upper and lower sides of a lateral side of the cargo hold 30 to be slanted at about 45° has been conventionally proposed to prevent sloshing. Forming chamfers at the cargo hold as above may distribute and attenuate sloshing load to an certain extent by changing the shape of the cargo hold.

However, the technique of forming chamfers at the cargo hold as in FIG. 2 is applicable only under standard loading conditions, and thus there is need for an alternative way to implement a cargo hold which is capable of safely withstanding the sloshing impact load even under partial loading.

In addition, in case of forming chamfers as above to reduce sloshing impact, the storage space in the cargo hold is relatively narrowed by the chamfers 31 and 32, and thereby the cargo hold may not be loaded with as much cargo as cargo holds in the same class.

DISCLOSURE

Technical Problem

Therefore, the present invention has been made in view of the above problems, and it is an object of the present invention to provide a sloshing impact reducing device for a cargo hold for a liquid cargo which allows the cargo hold to safely respond to sloshing impact not only under standard loading conditions but also under partial loading conditions by installing, in the cargo hold, an anti-sloshing member which is maintained on the surface of the liquid cargo by buoyancy generated by the cargo liquid, and a method of reducing the sloshing impact.

It is another object of the present invention to provide a sloshing impact reducing device for a cargo hold which can be loaded with a large quantity of cargo compared to other cargo holds of the same class by effectively reducing sloshing impact without chamfers as provided in a conventional cargo hold, and a method of reducing the sloshing impact.

Technical Solution

In accordance with an aspect of the present invention, the above and other objects can be accomplished by the provision of a sloshing impact reducing device for a cargo hold for a liquid cargo to reduce sloshing impact caused by motion of the liquid cargo including an ascent and descent guide 1 installed at a proper place in the cargo hold and provided with a floating body 10 having buoyancy raising the floating body to a surface of the liquid cargo, and an anti-sloshing member 2 confined to the floating body 10, maintained on the surface of the liquid by the floating body 10 to suppress sloshing of the liquid cargo.

The ascent and descent guide 1 may be installed at each right angle corner of the cargo hold.

The ascent and descent guide 1 may include a guide rail 12 installed at the corner of the cargo hold to guide ascent and descent movement of the floating body 10, and a connector 14 to connect the floating body 10 moving along the guide rail 12 and the anti-sloshing member 2.

The guide rail 12 may include an ascent and descent space 120 allowing the floating body 10 to ascend and descend therein, and a rail surface 122 formed in a direction of ascent and descent of the floating body 10, wherein the connector 14 may move along the rail surface 122.

The floating body 10 may be moved up and down, by buoyant force exerted by the liquid, in the ascent and descent space 120 defined by the guide rail 12.

A surface of the floating body 10 or an inner surface of the ascent and descent space 120 of the guide rail 12 may be coated with Teflon resin.

The floating body 10 may be a hollow body defining a closed space therein.

The hollow body may be formed of metal or glass fiber.

The floating body 10 may be formed of a collection of closed cells.

The anti-sloshing member 2 may be provided with a mesh structure having holes formed in a predetermined pattern.

A plurality of small pocket-type floats 20 containing a floating object may be formed at several places in the anti-sloshing member 2 in a regular or irregular pattern.

In accordance with another aspect of the present invention, there is provided a method of reducing sloshing impact in a cargo hold for a liquid cargo, wherein an anti-sloshing member 2 is raised to the surface of the liquid cargo by an ascent and descent guide 1 connected to the anti-sloshing member 2 and arranged at a proper place in the cargo hold to ascend and descend, such that the anti-sloshing member 2 is maintained on a surface of the liquid cargo and suppress sloshing of the liquid cargo when sloshing of the liquid cargo occurs.

The ascent and descent guide 1 may include a floating body 10 having buoyancy allowing the floating body 10 to ascend to the surface of the liquid cargo.

The anti-sloshing member 2 may be formed to have a mesh structure with a predetermined pattern.

The anti-sloshing member 2 may be provided with small pocket-type floats 20 containing a floating object formed at several places in a regular or irregular pattern, such that the anti-sloshing member 2 is provided with mobility corresponding to motion of the liquid cargo occurring in various forms. The anti-sloshing member 2 may be formed of a material having a lower specific gravity than the liquid cargo.

In accordance with another aspect of the present invention, there is provided a sloshing impact reducing device for a cargo hold for a liquid cargo to reduce sloshing impact caused by motion of the liquid cargo including an ascent and descent guide 1 installed at a proper place in a cargo hold, and an anti-sloshing member 2 guided to ascend and descend along the ascent and descent guide 1, and maintained on a surface of the liquid cargo by a float 20 so as to suppress sloshing of the liquid cargo.

The ascent and descent guide may include a floating body having buoyancy raising the floating body to a surface of the liquid cargo, and a connector to connect the floating body and the anti-sloshing member to each other.

Advantageous Effects

According to embodiments of the present invention, an anti-sloshing member is maintained on the surface of a liquid cargo in the cargo hold by a floating body to make movement corresponding to the motion of the liquid cargo, and thereby it may be possible to effectively provide resistance to the motion of the liquid cargo caused by movement of the vessel and effectively attenuate rocking of the liquid cargo.

According to the sloshing impact reducing device and method of reducing sloshing impact in accordance with embodiments of the present invention, an anti-sloshing member is provided with movement corresponding to the amount and motion of a liquid cargo to produce resistance to the motion of the liquid cargo, and thereby it may be possible to effectively cope with impact from sloshing not only under standard loading conditions but also partial loading conditions.

Also, due to the anti-sloshing member producing resistance corresponding to the motion of the liquid cargo, it may be possible to effectively reduce sloshing impact without forming chamfers as in conventional cases, and further as it is possible to provide a wide space for the cargo hold by eliminating the chamfers, the cargo hold may be allowed to be loaded with larger volumes of cargo than other cargo holds for the same vessel.

BEST MODE

Hereinafter, exemplary embodiments of the present invention will be described in detail with reference to the accompanying drawings.

For convenience of description, a sloshing impact reducing device according to an exemplary embodiment of the present invention will be described below for a case in which the sloshing impact reducing device is applied to a conventional membrane-type cargo hold. However, it should be noted that the sloshing impact reducing device according to the exemplary embodiment of the present invention is applicable not only to the membrane type cargo hold, but also to any tank containing liquefied natural gas (LNG) such as an independent tank, not being limited to a specific structure or shape.

Figure 3:
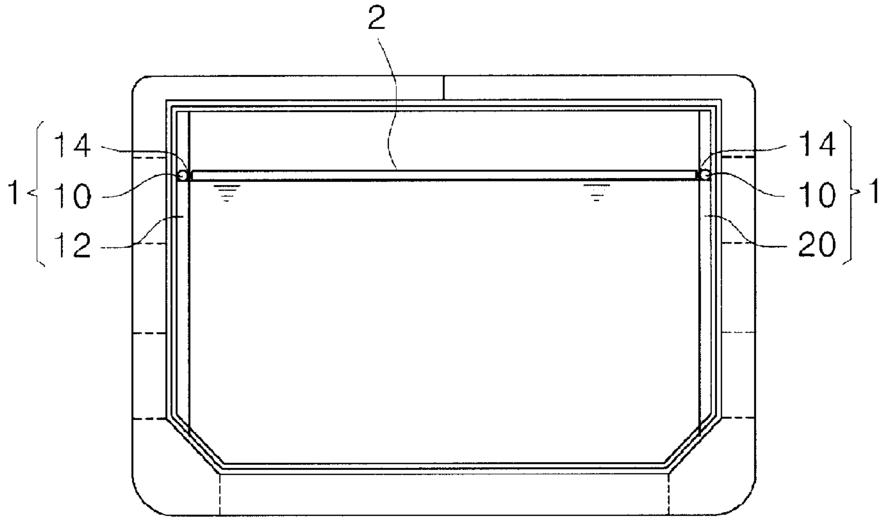
FIG. 3 is a cross-sectional view schematically illustrating a cargo hold having a sloshing impact reducing device for a cargo hold for a liquid cargo according to an exemplary embodiment of the present invention installed therein.
Figure 4:
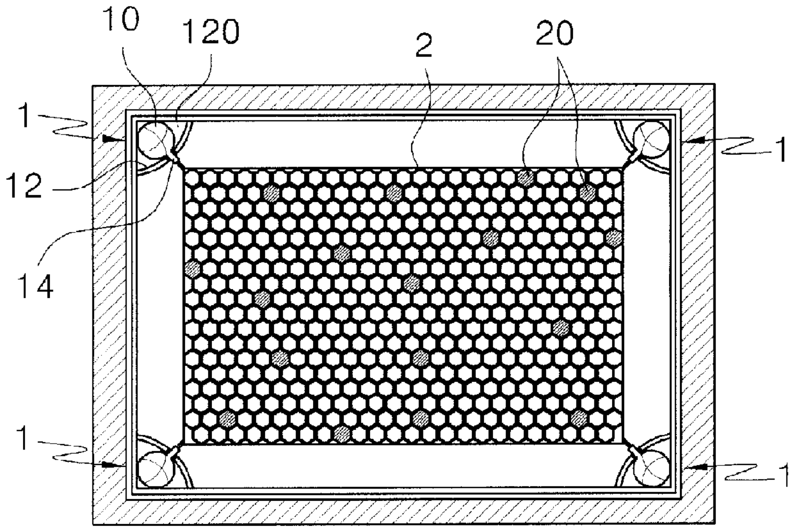
FIG. 4 is a plan view schematically illustrating the cargo hold having the sloshing impact reducing device according to the exemplary embodiment of the present invention.

FIGS. 3 and 4 are a cross-sectional view and plan view schematically illustrating a cargo hold having a sloshing impact reducing device for a cargo hold for a liquid cargo according to the illustrated embodiment of the present invention installed therein.

The sloshing impact reducing device for a cargo hold for a liquid cargo according to the illustrated embodiment of the present invention is provided with a member to suppress sloshing positioned on the surface of the liquid in the cargo hold by a floating body 10 having buoyancy such that the member may produce resistance against the motion of the liquid cargo caused by movement of a vessel, while moving corresponding to the motion of the liquid cargo. The illustrated embodiment of the present invention is described in more detail below.

With reference to FIGS. 3 and 4, the sloshing impact reducing device may include an ascent and descent guide 1 and an anti-sloshing member 2. The ascent and descent guide 1 is installed at a proper place in the cargo hold and includes the floating body 10 having buoyancy which allows the floating body 10 to rise to the surface of the stored liquid, and the anti-sloshing member 2, which is confined to the floating body 10, is maintained on the surface of the liquid by the floating body 10 to suppress sloshing of the liquid cargo. The illustrated embodiment of the present invention is described in more detail below with reference to FIG. 5.

Figure 5:
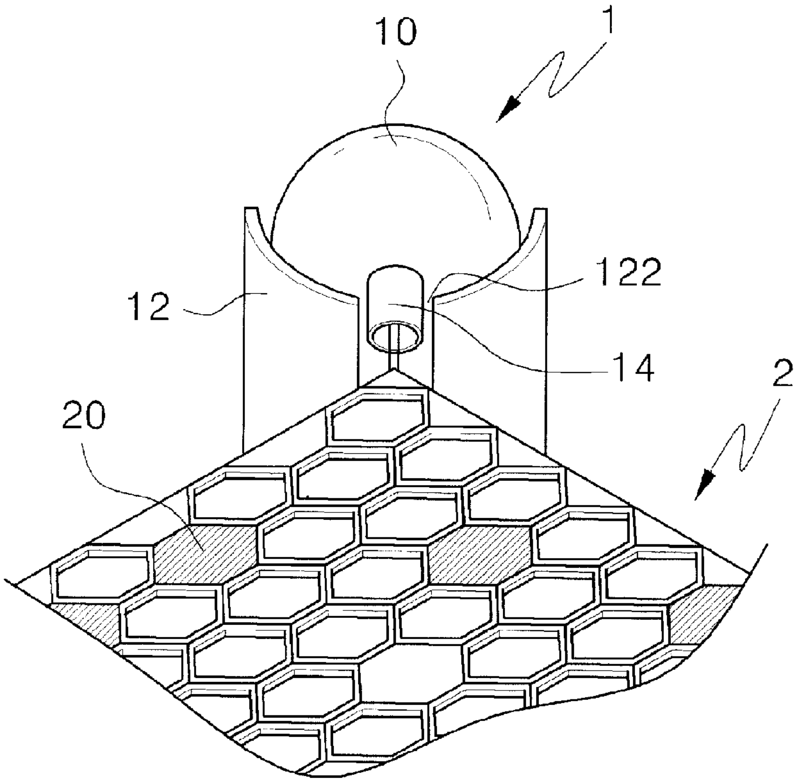
FIG. 5 is an enlarged perspective view illustrating main parts of the sloshing impact reducing device according to the exemplary embodiment of the present invention.

FIG. 5 is an enlarged perspective view illustrating main parts of the sloshing impact reducing device for a cargo hold for a liquid cargo according to the exemplary embodiment of the present invention With reference to FIG. 5, the ascent and descent guide 1 may be installed at each right angle corner of the cargo hold, and include the floating body 10 to provide buoyancy to maintain the anti-sloshing member 2 on the surface of the liquid cargo, a guide rail 12 installed at the corner of the cargo hold to guide ascent and descent of the floating body 10, and a connector 14 to move along the guide rail 12 to connect the floating body 10 and the anti-sloshing member 2.

The connector 14 may connect the floating body 10 and the anti-sloshing member 2 to each other via a connecting member (not shown) such as a wire or string. The connecting member may be formed of the same material as that of the anti-sloshing member 2, without being limited thereto. The connecting member may be formed of a material capable of withstanding cryogenic temperatures.

The guide rail 12 may be provided with an ascent and descent space 120 allowing the floating body 10 to ascend and descend therein, and a rail surface 122 formed in the direction of ascent and descent of the floating body 10, and the connector 14 may be arranged to move along the rail surface 122 formed at the guide rail 12. In the configuration as above, the floating body 10 may be freely moved up and down, by buoyant force exerted by the liquid, in the ascent and descent space 120 defined by the guide rail 12.

When the floating body 10 ascends in the ascent and descent space 120 of the guide rail 12, contact between the floating body 10 and the inner surface of the ascent and descent space 120 may frequently occur. Coating the surface of the floating body 10 or the inner surface of the ascent and descent space 120 of the guide rail 12 with Teflon may reduce friction generated by contact between the floating body 10 and the guide rail 12.

In the illustrated embodiment, the floating body 10 may be formed of a metal or glass fiber undergoing little contraction and deformation under a cryogenic condition, and a hollow body defining a closed space inside may be used to impart buoyancy to the floating body 10. Also, the floating body may be formed of a collection of closed cells of a material, e.g., plastic or Styrofoam, which does not allow inflow of liquid thereinto, such that the floating body may function even when a portion of the floating body is damaged. Any material or shape is applicable so long as the floating body has a specific gravity lower than the LNG (the liquid cargo stored in the cargo hold) and floats on the liquid cargo.

Figure 6:
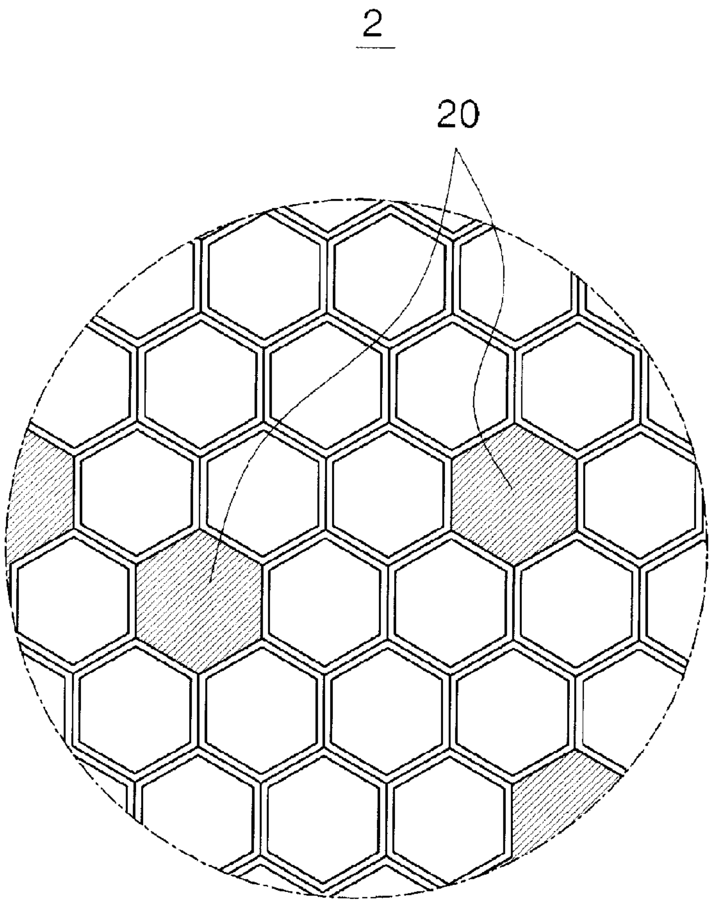
FIG. 6 is an enlarged plan view illustrating an example of an anti-sloshing member of FIG. 5.
Figure 7:
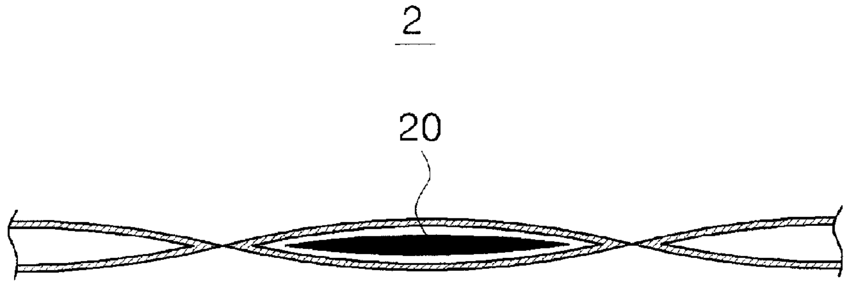
FIG. 7 is a lateral cross-sectional view illustrating main parts of the anti-sloshing member of FIG. 6.

FIGS. 6 and 7 are a plan view and a lateral cross-sectional view illustrating an example of the anti-sloshing member applied to the illustrated embodiment With reference to FIGS. 6 and 7, the anti-sloshing member 2 applied to the illustrated embodiment may be provided with a mesh structure having holes formed in a certain pattern. The pattern of the holes is not limited to specific shapes such as grid and circle and any shape is applicable so long as the pattern disturbs the flow of the liquid cargo through the holes during motion of the liquid cargo.

For example, if the holes are formed in the honeycomb pattern in which hexagonal cells are disposed to adjoin each other, it may be possible to implement the anti-sloshing member 2 that resists motion of the liquid cargo, having high durability against the motion of the liquid cargo.

If the anti-sloshing member 2 is formed to have the mesh structure as above, the magnitude of resistance to motion of the fluid may be adjusted, and efficiency of attenuation of sloshing and strength of the anti-sloshing member 2 may be properly set, by changing the size of the mesh, the thickness of the wire configuring the mesh, and the size and spacing of the holes. Consequently, the present embodiment may more efficiently suppress sloshing according to the capacity of the cargo hold and the kind of the stored cargo.

In forming a mesh structure for the anti-sloshing member 2, the anti-sloshing member 2 may be provided with mobility corresponding to motion of the liquid cargo occurring in various forms, by forming small pocket-type floats 20 containing a floating object at several places in a regular or irregular pattern as shown in FIGS. 6 and 7.

The floating object may be formed of a material identical to or different from that of the floating body 10. For example, both the floating object and the floating body 10 may be formed of a hollow body or a collection of closed cells, or it may be possible that the floating object is a hollow body, while the floating body is a collection of closed cells, or vice versa.

If the pocket-type floats 20 are formed at several places in the anti-sloshing member 2 as above, the buoyancy of the floating body 10 and the buoyancy of the pocket-type floats 20 may be combined to allow the anti-sloshing member 2 to more stably float on the surface of the liquid in the cargo hold and make movement on the surface of the cargo more actively adapted to the motion of the cargo, thereby effectively resisting the motion of the liquid cargo induced by the motion of the vessel, i.e., sloshing.

Even if the floating body 10 arranged in the ascent and descent guide 1 loses buoyancy, the anti-sloshing member 2 may still float on the surface of the liquid in the cargo hold by the buoyancy of the floats 20 of the anti-sloshing member 2.

As another example, although not shown in the figures, the anti-sloshing member 2 may be formed of a material having a specific gravity lower than that of LNG. In this case, the pocket-type floats as in the above example may not be needed, and floating of the anti-sloshing member 2 on the surface of the liquid cargo may be implemented in a different way than that in the illustrated embodiment of the present invention.

Hereinafter, a method of reducing sloshing impact in a cargo hold for a liquid cargo according to one aspect of the present invention will be described.

In the method of reducing sloshing impact according to one aspect of the present invention, the anti-sloshing member 2 is raised to the surface of the liquid cargo by the floating bodies 10 arranged in proper places to ascend and descend, such that the anti-sloshing member 2 may be maintained on the surface of the liquid cargo by the floating bodies 10 to suppress sloshing of the cargo.

That is, the above method of reducing sloshing impact is to maintain the anti-sloshing member 2 on the surface of the liquid cargo with buoyant force exerted by the stored liquid cargo on the floating bodies 10 to allow the anti-sloshing member 2 to make movement corresponding to variation in the amount of the stored liquid cargo and motion thereof and effectively produce resistance to the motion of the liquid cargo induced by the movement of the vessel.

The anti-sloshing member 2 is formed to have a mesh structure having a certain pattern, and the small pocket-type floats containing a floating object are formed at several places in a regular or irregular pattern, such that the anti-sloshing member 2 is provided with movement corresponding to motion of the liquid cargo occurring in various forms.

According to the illustrated embodiment of the present invention as above, the anti-sloshing member 2 having the mesh structure makes movement according to motion of the liquid while being maintained on the surface of the liquid by the floating bodies 10 in the cargo hold. Therefore, when motion of the liquid cargo is caused by the behavior of the vessel, the flow of the liquid cargo is disturbed, and free motion of the liquid cargo is suppressed, as the liquid cargo passes through the holes formed in the anti-sloshing member 2.

That is, due to motion of the anti-sloshing member 2 corresponding to the movement of the liquid cargo, resistance to the flow of the liquid cargo caused by the behavior of the vessel may be more effectively produced, and ultimately sloshing of the liquid cargo may be more effectively attenuated.

In addition, the anti-sloshing member 2 according to the illustrated embodiment of the present invention is provided with ascent and descent movement according to the change in the level of the liquid cargo, while being confined to the ascent and descent guide 1. Thereby, even when there is a change not only in the flow of the liquid cargo but also in the amount of the stored liquid cargo, the anti-sloshing member 2 remains on the surface of the liquid. Therefore, it may be possible for the illustrated embodiment of the present invention to effectively respond to sloshing impact, not only under standard loading conditions, but also under partial loading conditions.

Figure 1:
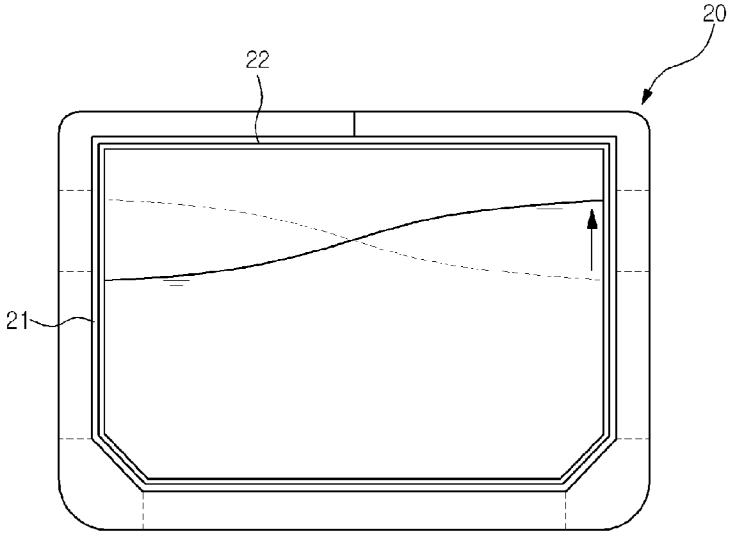
FIG. 1 is a view illustrating motion (sloshing) of a liquid cargo stored in a cargo hold.
Figure 2:
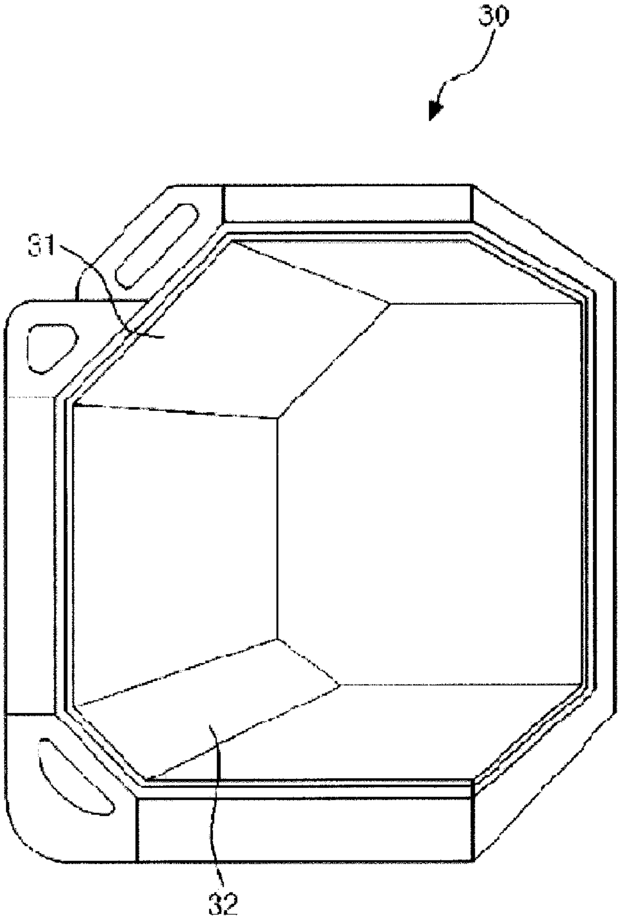
FIG. 2 is a cutaway perspective view illustrating a conventional cargo hold for a liquid cargo having chamfers formed therein to prevent sloshing.

In contrast with conventional cases in which attempts to reduce sloshing impact are made by forming a chamfer (see FIG. 2, reference numerals 31 and 32), a slanted face of the wall in the cargo hold, the illustrated embodiment of the present invention may effectively reduce sloshing impact without forming a chamfer as in the conventional cases, due to the anti-sloshing member 2 which produces resistance corresponding to flow of the liquid cargo.

Consequently, since it is possible to provide a wide space for the cargo hold by eliminating the chamfers, the cargo hold may be allowed to be loaded with larger volumes of cargo than other cargo holds for the same vessel.

Although a few embodiments of the present invention have been shown and described, it would be appreciated by those skilled in the art that changes may be made in these embodiments without departing from the principles and spirit of the invention, the scope of which is defined in the claims and their equivalents.

The invention claimed is:

1. A sloshing impact reducing device for a cargo hold of a vessel for a liquefied natural gas (LNG) to reduce sloshing impact caused by motion of the LNG, comprising:

ascent and descent guides at proper places in the cargo hold and each including a floating body having buoyancy, which is capable of allowing the floating body to rise to a surface of the LNG; and an anti-sloshing member confined to the floating body at each corner thereof, maintained on the surface of the LNG by the floating body to suppress the sloshing impact of the LNG, wherein each of the ascent and descent guides further includes, a guide rail at a corner of the cargo hold, at which adjacent sidewalls of the cargo hold join each other, the guide rail configured to guide an ascent and descent movement of the floating body, the guide rail defining an ascent and descent space in association with the sidewalls of the cargo hold, and the guide rail provided with one pair of rail surfaces in a direction of the ascent and descent movement, the one pair of rail surfaces facing each other and defining a slit in the direction of the ascent and descent movement, and a connector connecting the floating body to a corner of the anti-sloshing member, the connector configured to move along the slit of the guide rail, and wherein the floating body is configured to ascend and descend in the ascent and descent space according to a buoyant force exerted by the LNG.

2. The sloshing impact reducing device according to claim 1, wherein each of the ascent and descent guides is at each of right angle corners of the cargo hold.

3. The device according to claim 1, wherein at least one of a surface of the floating body or an inner surface of the ascent and descent space is coated with a friction reducing material.

4. The device according to claim 1, wherein the anti-sloshing member is provided with a mesh structure having holes formed in a pattern.

5. The device according to claim 4, wherein the anti-sloshing member provided with the mesh structure further includes a plurality of small pocket-type floats containing a floating object at several places in a regular or irregular pattern.

6. The device according to claim 1, wherein the floating body has a specific gravity lower than the LNG.

7. The device according to claim 1, wherein the anti-sloshing member is formed of a material having a specific gravity lower than that of the LNG.

* * * * *